(12) United States Patent
Manapragada (10) Patent No.: US 9,788,305 B2
(45) Date of Patent: Oct. 10, 2017

(54) METHOD AND APPARATUS FOR PROCESSING BANDWIDTH INTENSIVE DATA STREAMS USING VIRTUAL MEDIA ACCESS CONTROL AND PHYSICAL LAYERS

(71) Applicant: Sai C. Manapragada, Hayward, CA (US)

(72) Inventor: Sai C. Manapragada, Hayward, CA (US)

( * ) Notice: Subject to any disclaimer, the term of this patent is extended or adjusted under 35 U.S.C. 154(b) by 141 days.

(21) Appl. No.: 14/526,792

(22) Filed: Oct. 29, 2014

(65) Prior Publication Data

US 2015/0117367 A1   Apr. 30, 2015

Related U.S. Application Data

(60) Provisional application No. 61/897,216, filed on Oct. 30, 2013.

(51) Int. Cl.
*H04W 72/04* (2009.01)
*H04W 72/02* (2009.01)

(52) U.S. Cl.
CPC ........ *H04W 72/02* (2013.01); *H04W 72/0453* (2013.01)

(58) Field of Classification Search
CPC ............. H04W 72/02; H04W 72/0453; H04W 80/00–80/12; H04W 28/20; H04W 28/14; H04W 16/02; H04W 84/12; H04L 29/08018; H04L 29/08027; H04L 29/06537; H04L 61/6022; H04L 12/2439; H04L 12/40065; H04L 41/0896; H04L 47/52; H04L 2012/6456; H04L 47/783; H04L 2012/5607; H04L 5/0005

See application file for complete search history.

(56) References Cited

U.S. PATENT DOCUMENTS

| 2005/0089064 A1* | 4/2005 | Zimmerman ...... H04Q 11/0478 370/468 |
| 2007/0110198 A1* | 5/2007 | Skarby ................. H04B 1/1027 375/349 |

(Continued)

*Primary Examiner* — Charles C Jiang
*Assistant Examiner* — Rose Clark
(74) *Attorney, Agent, or Firm* — Lance Kreisman; Peninsula Patent Group (57) ABSTRACT

A wireless networking system is disclosed. The wireless networking system includes an application layer associated with one or more applications having a wireless bandwidth requirement. A first wireless transceiver resource associated with an actual MAC layer and PHY layer is employed. The first wireless transceiver resource has a first bandwidth availability up to a first actual bandwidth. A second wireless transceiver resource associated with the actual MAC layer and the PHY layer is employed. The second wireless transceiver resource has a second bandwidth availability up to a second actual bandwidth. A processing layer evaluates the wireless bandwidth requirement and the first and second bandwidth availabilities of the wireless transceiver resources. The processing layer includes a bandwidth allocator to allocate at least a portion of each of the first and second actual bandwidths to virtual MAC and virtual PHY layers, and to satisfy the application layer wireless bandwidth requirement.

19 Claims, 6 Drawing Sheets

(56) References Cited

U.S. PATENT DOCUMENTS

| | | | | |
|---|---|---|---|---|
| 2007/0121573 A1* | 5/2007 | Zuckerman | ............ | H04W 92/02 370/350 |
| 2007/0180119 A1* | 8/2007 | Khivesara | ............ | H04L 12/1881 709/226 |
| 2007/0270121 A1* | 11/2007 | Shao | ............ | H04W 72/02 455/403 |
| 2009/0034460 A1* | 2/2009 | Moratt | ............ | H04W 72/04 370/329 |
| 2009/0141691 A1* | 6/2009 | Jain | ............ | H04W 88/10 370/338 |
| 2013/0196653 A1* | 8/2013 | Morrison | ............ | H04W 28/08 455/426.1 |
| 2013/0258921 A1* | 10/2013 | Gevorkov | ............ | H04W 72/1242 370/311 |
| 2013/0281049 A1* | 10/2013 | Lee | ............ | H04W 24/00 455/405 |
| 2014/0003449 A1* | 1/2014 | Li | ............ | H04W 4/00 370/468 |
| 2014/0213219 A1* | 7/2014 | Mohebbi | ............ | H04W 92/02 455/411 |
| 2015/0098359 A1* | 4/2015 | Yen | ............ | H04W 88/04 370/254 |

* cited by examiner

METHOD AND APPARATUS FOR PROCESSING BANDWIDTH INTENSIVE DATA STREAMS USING VIRTUAL MEDIA ACCESS CONTROL AND PHYSICAL LAYERS

CROSS-REFERENCE TO RELATED APPLICATIONS

This patent application claims the benefit of U.S. Provisional Patent Application Ser. No. 61/897,216, filed Oct. 30, 2013, which is incorporated by reference herein in its entirety.

TECHNICAL FIELD

The disclosure herein relates to wireless networks, and more specifically to high-bandwidth wireless networks for distributing multi-media content.

BACKGROUND

Wireless networks may take many forms, depending on the application. Various WiFi standards exist where users within range of a "hotspot" may establish a wireless link to access a given network. Another common way to access a wireless network is through mobile cellular transmissions. WiFi and cellular technologies rely on very different wireless radios and data protocols in transferring data over the network.

With the proliferation of multi-media content over wireless networks comes an insatiable demand for more bandwidth over the networks. Conventional wireless networking architectures fail to take full advantage of the resources available to satisfy the desire for more bandwidth.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of wireless networking systems, wireless transceivers and associated methods are disclosed herein. In one embodiment, a wireless networking system is disclosed. The wireless networking system includes an application layer associated with one or more applications having a wireless bandwidth requirement. A first wireless transceiver resource associated with an actual MAC layer and PHY layer is employed. The first wireless transceiver resource has a first bandwidth availability up to a first actual bandwidth. A second wireless transceiver resource associated with the actual MAC layer and the PHY layer is employed. The second wireless transceiver resource has a second bandwidth availability up to a second actual bandwidth. A processing layer evaluates the wireless bandwidth requirement and the first and second bandwidth availabilities of the wireless transceiver resources. The processing layer includes a bandwidth allocator to allocate at least a portion of each of the first and second actual bandwidths to virtual MAC and virtual PHY layers, and to satisfy the application layer wireless bandwidth requirement.

In a further embodiment, a method of a method of operating a wireless transceiver system is disclosed. The wireless transceiver system includes an application layer, actual MAC and PHY layers, and a processing layer between the actual MAC and PHY layers. The method includes evaluating, with processing logic, application bandwidth requirements of applications associated with the applications layer. A virtual MAC layer and a virtual PHY layer are defined between the processing layer and the actual MAC and PHY layers. A bandwidth allocator allocates multiple wireless transceiver resources in the actual MAC and PHY layer to be controlled by the virtual MAC and PHY layer to satisfy the application bandwidth requirements. A stream of processed data is transferred via a wireless link with the allocated wireless transceiver resources.

In yet another embodiment, a wireless transceiver for coupling to a wireless duplex link is disclosed. The wireless transceiver includes programmable storage, a transmitter and a receiver. The transmitter couples to the programmable storage and transmits data along a wireless link during a first portion of a programmed data transfer cycle. The receiver couples to the programmable storage and receives data from the wireless link during a second portion of the programmed data transfer cycle. The wireless link exhibits an asymmetric transmit/receive profile based on information stored in the programmable storage.

Figure 1:
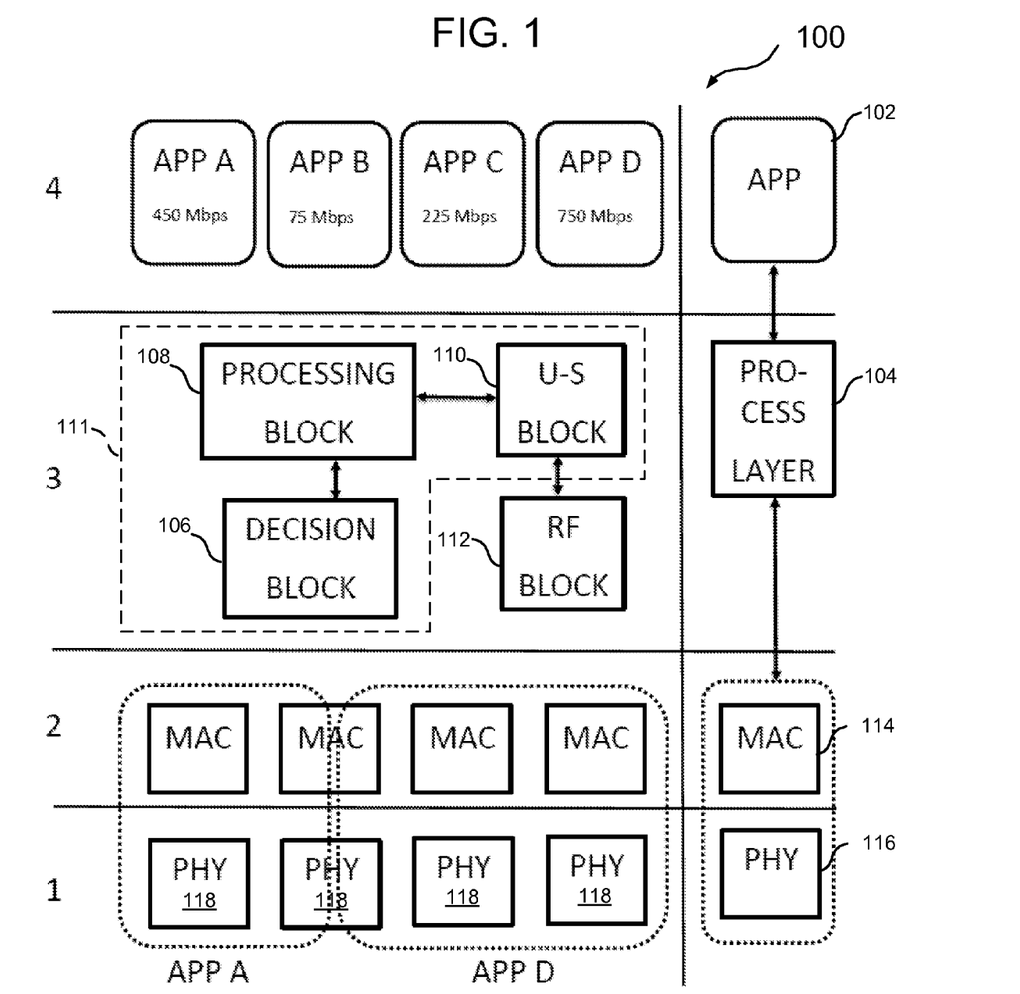
FIG. 1 illustrates one embodiment of a virtualization mode and an actual mode for processing wireless signals.

Referring to FIG. 1, one embodiment of a wireless networking system, generally designated 100, is shown in an abstract "layer" context. Generally speaking, the system may involve a WiFi network, a mobile wireless network, or a combination of the two. The network includes an application layer "APP", at 102, with one or more data-intensive software applications "APP A"-"APP D." The individual applications, for example, may have different peak bandwidth requirements in terms of data transfer rates. Thus, for instance, application APP A may have a peak bandwidth requirement of 450 Megabits per second (Mbps), while application APP D may have a peak bandwidth requirement of 750 Mbps.

Further referring to FIG. 1, the application layer 102 cooperates with a process layer, at 104. The process layer includes a decision block 106 that interfaces with a processing block 108. The decision block determines the size and type of data stream being received, and the type of processing necessary to put the stream in a format where it is capable of being transmitted. The processing block processes the data stream as determined by the decision block, and couples to an ultra-streaming block 110. The ultra-streaming block manages the processing of signal streams or sub-streams given the available resources (memory, processing speed, number of available radios, etc.), and packetizes sufficiently processed streams or sub-streams. The ultra-streaming block feeds data to and from an RF block 112.

While not explicitly shown in FIG. 1, the ultra-streaming block carries out a monitoring function, more fully described below, that feeds back wireless resource availability to the decision block 106. Various ways for determining availability of resources include common memory, host interfaces, common threads, and/or queues or other data structures.

The decision block 106, processing block 108 and ultra-streaming block 110 together form a virtual MAC layer 111. The RF block 112 forms a virtual PHY layer. As more fully described below, the virtual MAC and PHY layers enable simultaneous allocation of multiple PHY resources for different signal types associated with different applications. As a result, the wireless networking system 100 exhibits significant performance improvements and efficiency advantages.

With continued reference to FIG. 1, the wireless networking system 100 includes an actual media access control (MAC) layer, at 114, and an actual physical (PHY) layer, at 116. The actual MAC layer 114 generally includes software resources capable of controlling one or more transceiver resources 118 that are at the actual PHY layer, such as various radios and receivers. The actual PHY layer 116 may include multiple transceiver resources corresponding to multiple radios, each with an actual data transfer capability, or bandwidth.

The actual PHY layer transceivers may transmit and receive data consistent with a variety of signal protocols, such as High Definition Multimedia Interface (HDMI) consistent with the IEEE 802.11 Standard, Multiple-In Multiple-Out (MIMO), standard Wi-Fi physical control layer (PHY) and Media Access Control (MAC) layer, and existing IP protocols. Additionally, extremely high bandwidth applications such as Voice Over IP (VOIP), streaming audio and video content, multicast applications, convergent and ad-hoc network environment may employ signal protocols consistent with the wireless network system described herein. Additionally, the wireless networking system may be employed and/or embedded into a variety of electronic devices, including wireless access points, base stations, handhelds, tablets, computers, telephones, televisions, DVD players, BluRay players, media players, storage devices, or any such devices that use wireless networks to send and receive data including stand-alone add-on devices such as "dongles" that serve as wireless interfaces between devices.

Figure 2:
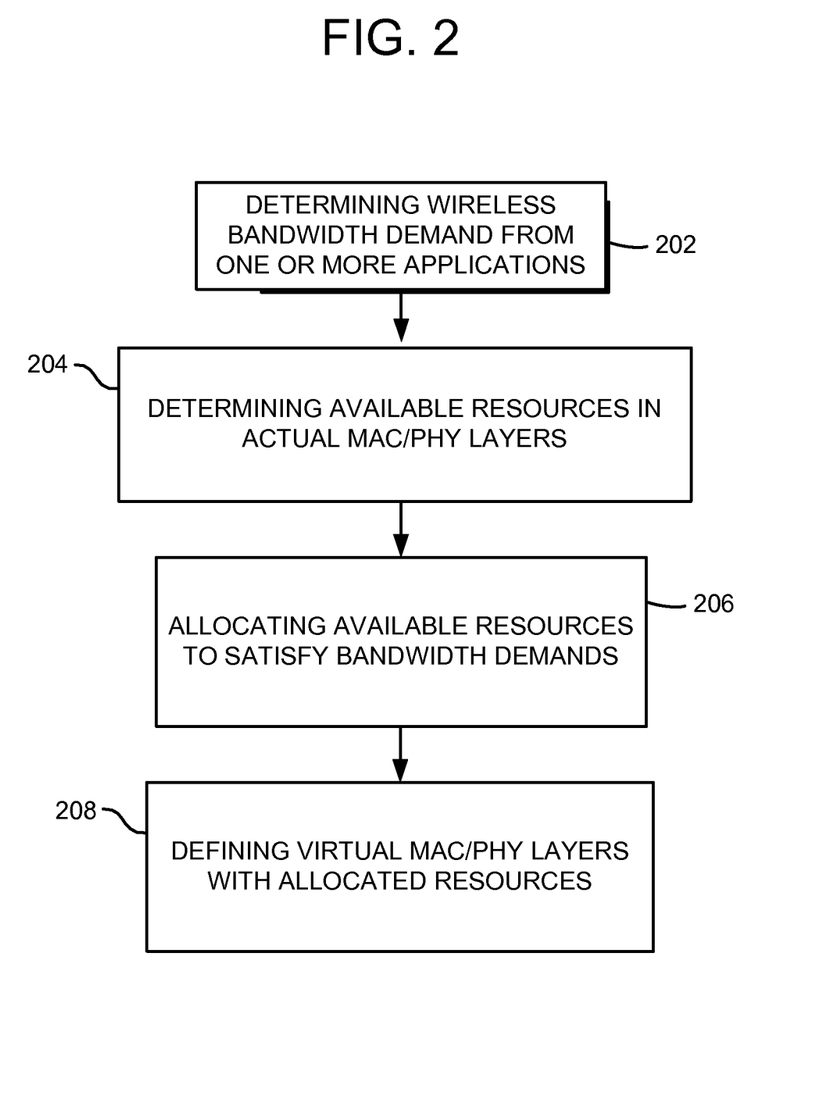
FIG. 2 illustrates a flowchart of steps employed in one embodiment of a method of operation of the system of FIG. 1.

In operation, and referring to FIG. 2, the wireless networking system generally determines an overall wireless bandwidth demand or requirement from one or more applications associated with the application layer 102, at 202. FIG. 1 illustrates one example, with Application A demanding a peak bandwidth of 450 Mbps, and Application D requiring a peak bandwidth of 740 Mbps. At 204, the process layer 104 determines available resources in the actual MAC and PHY layers 114 and 116, and allocates the available resources to satisfy the bandwidth demands, at 206.

Using the same example shown in FIG. 1, and assuming that all of the PHY transceivers are available, each PHY transceiver 118 is capable of providing a transmit/receive bandwidth of 300 Mbps. Grouping the entire bandwidth of one transceiver with half the bandwidth of a second satisfies the bandwidth demand for Application A. In a similar manner, allocating the bandwidths of two transceivers, and half the bandwidth of a third transceiver satisfies the bandwidth demand for Application D. The allocating is managed by defining the virtual MAC/PHY layers 111 and 112 with the allocated resources, at 208.

Figure 3:
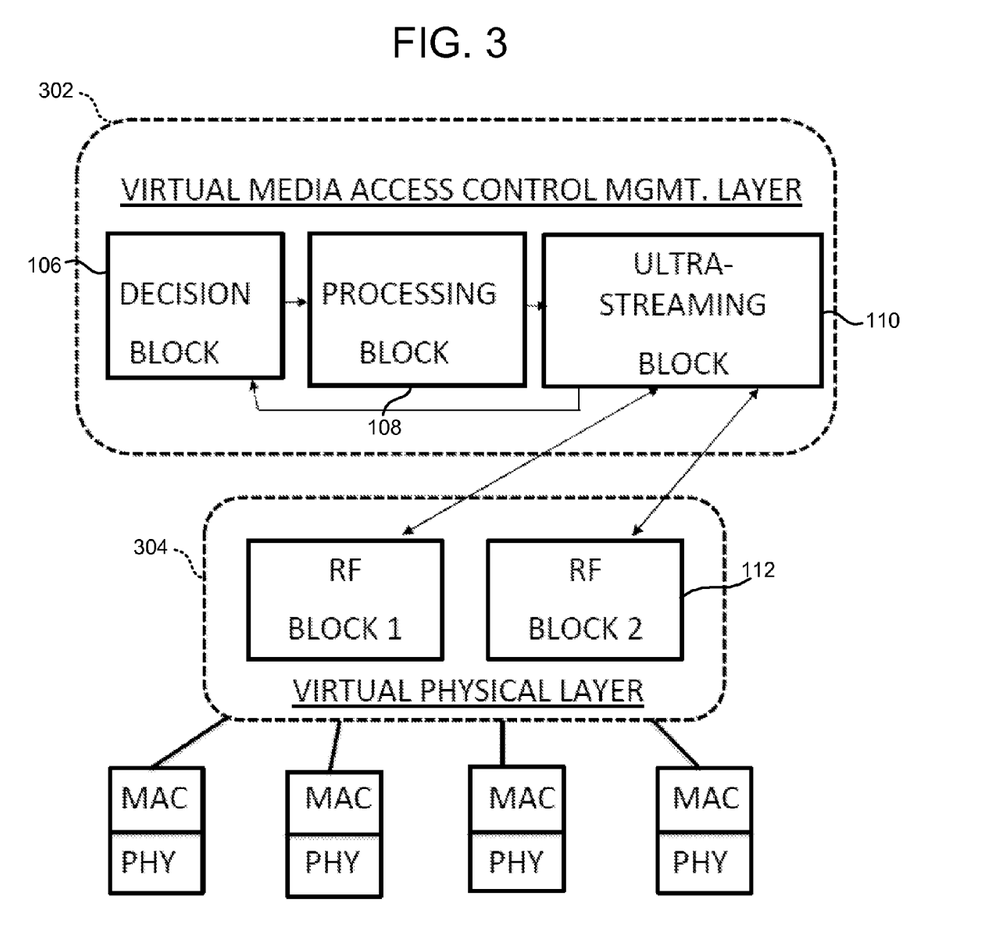
FIG. 3 illustrates how a virtual MAC and virtual PHY are coordinated to manage actual MAC and PHY layers.

FIG. 3 illustrates how, in one embodiment, elements associated with the process layer 104 can define a virtual MAC management layer 302 and a virtual PHY layer 304 to enable the sharing of multiple transceiver resources in a way sufficient to satisfy the bandwidth requirements of multiple applications running simultaneously. The virtual MAC and PHY layers manage signals from one or more applications before sending the signals to the actual MAC and PHY layers. The virtual MAC management layer 302 may include the decision block 106, the processing block 108 and the ultra-streaming block 110. The virtual PHY layer 304 may include the RF block 112, shown as multiple RF blocks to denote the virtual use of two sets of allocated transceiver resources. For one embodiment, the RF block(s) communicate directly with the ultra-streaming block about actual resource availability, and the ultra-streaming block sends the information back to the decision block in the virtual MAC layer. Alternatively, the virtual PHY RF block may directly communicate with the virtual MAC decision block and/or the processing block.

Figure 4:
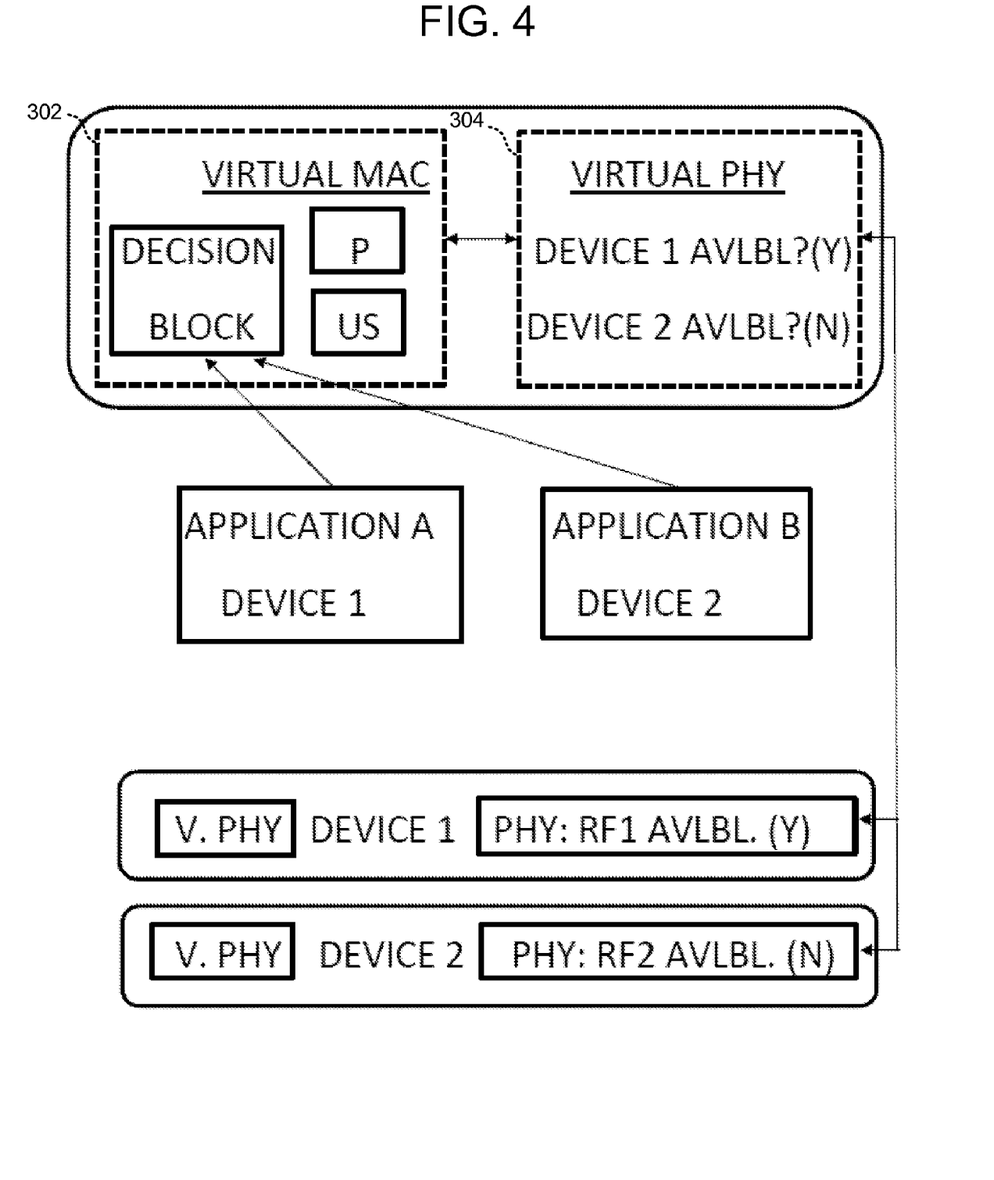
FIG. 4 illustrates how the system of FIG. 2 manages signal processing by determining which resources are available.

Referring now to FIG. 4, defining the virtual MAC and PHY layers 302 and 304 involves an evaluation of available transceiver resources to meet peak bandwidth demands of applications running in the application layer. One or more applications, such as "Application A" and "Application B", may be initially supported with transceiver resources "Device 1" and "Device 2" through an initialization or training process at startup. The virtual MAC 302 interfaces with the virtual PHY 304 to determine device availability. This further involves a determination at the PHY layer as to the actual availability of the initially assigned transceiver resources. Should a given resource be unavailable, such as through insufficient bandwidth or having an existing assignment, a replacement resource may be identified and assigned. Availability monitoring may be carried out at initialization, as described above, or through periodic or continuous updating based on environmental conditions or through random on demand programming. Adaptively managing the actual resources provides efficient utilization of resources and power.

Figure 5A:
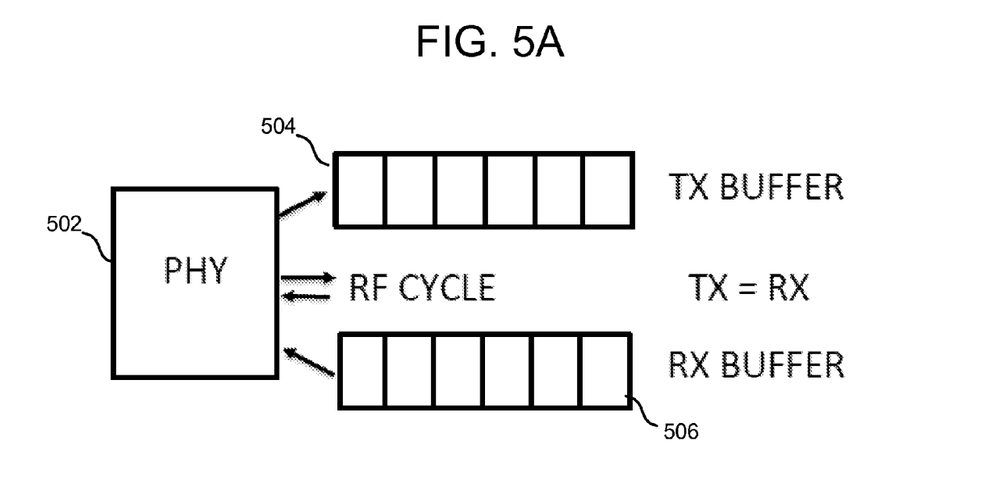
FIGS. 5A and 5B illustrate alternative ways to manage one embodiment of a variable-duplex link.

For one embodiment, the virtual MAC 302 and virtual PHY 304 may be employed to control respective transmit and receive times (also referred to as an RF cycle) for a transceiver coupled to a variable duplex wireless link. FIG. 5A illustrates a way of ensuring an RF cycle that has a transmit time equal to a receive time, such that a first amount of data is transmitted along a given link that is equal to a second amount of data that is received along the link. A physical resource PHY 502, such as a wireless transceiver, is shown coupled to a transmit buffer 504 and a receive buffer 506. By providing transmit buffer storage that is equal to the receive buffer storage, the amount of data transmitted during both portions of the cycle is equal (since the transceiver generally transmits and receives the entire contents of a given buffer before switching to the next portion of the cycle).

Figure 5B:
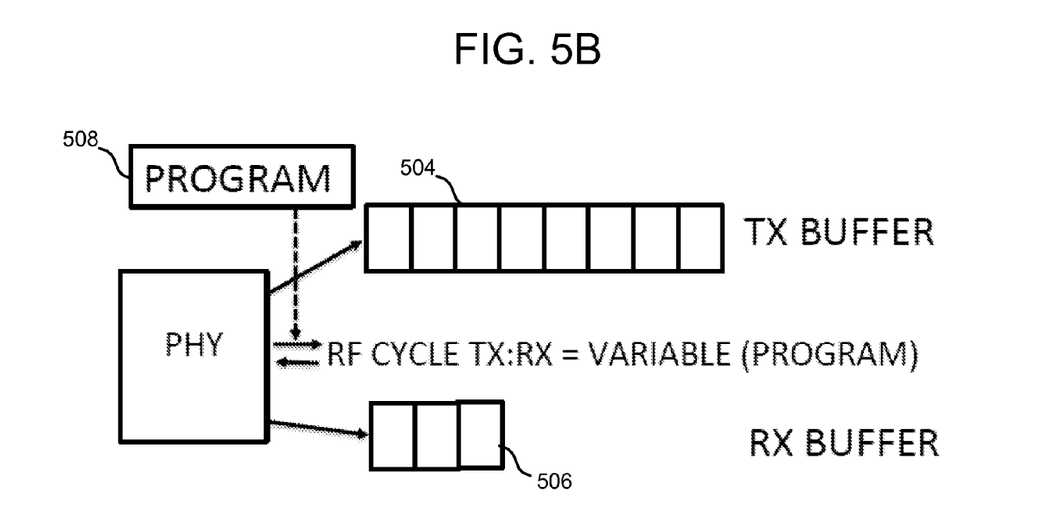

While equal transmit and receive portions of the RF cycle may be beneficial in some circumstances, allocating different PHY resources for different applications, as described above, may benefit from asymmetric wireless links, where the transmit or receive times may be different to optimize wireless data traffic. FIG. 5B illustrates one embodiment of a variable duplex link that includes a transmit buffer 504 that is larger than a receive buffer 506. A programmable register 508 provides a way to specify the storage capacities of each of the buffers, thus enabling control of the respective transmit and receive time. In another embodiment, the programmable register may include storage to specify precise transmit and receive times for the RF cycle in addition to, or instead of varying the buffer sizes. For some embodiments, sub-programmable mask intervals may be programmed which disable a given transmitter or receiver during the pre-programmed transmit or receive time.

Figure 6:
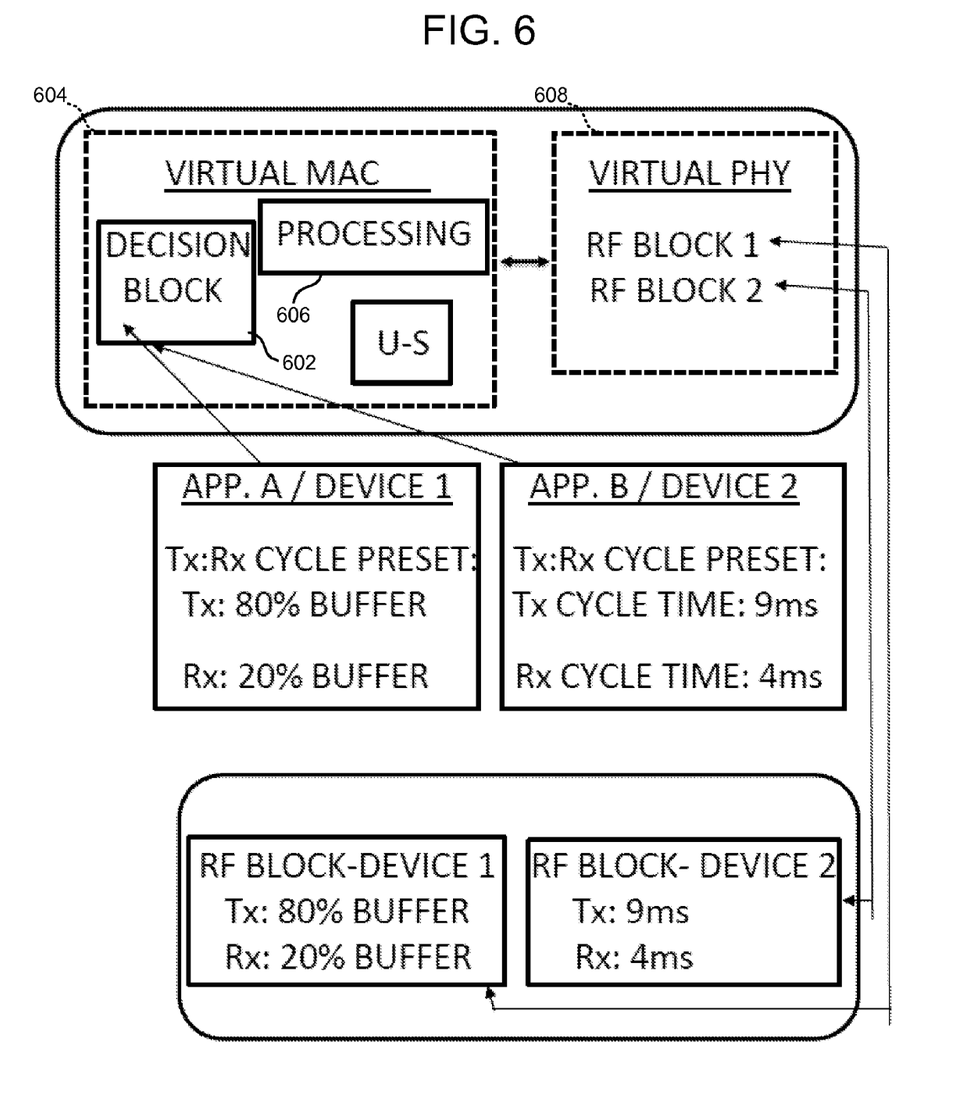
FIG. 6 illustrates one embodiment of a variable duplex link that is configurable to manage transmit and receive process cycles, including preset process cycle configurations of different types.

FIG. 6 illustrates one embodiment of the wireless networking system, described above, utilizing the variable duplex link to optimize uplink (transmit) and downlink (receive) data transfer efficiency for a given application. As shown in FIG. 6, a decision block 602 associated with a virtual MAC 604 detects application types, APP A and APP B, for which a preset transmit/receive cycle ratio has been assigned. A processing block 606 processes the substream signals together with the preset cycle ratio information. A virtual PHY 608, configures available devices to the preset cycle ratio in terms of either configuring transmit and receive buffer sizes, and/or configuring actual transmit and receive cycle times.

The virtual MAC and PHY layers 604 and 608 may also be used to reconfigure, or update, the RF cycle times of the link periodically or continuously. Additionally, random on-demand programming may be employed to reconfigure the link. By monitoring parameters associated with the link, a predictive model of optimal link operation may be adaptively generated, resulting in enhanced link operability.

Those skilled in the art will appreciate that the embodiments described above enable wireless networking systems to operate at higher levels of performance and with better efficiencies. By employing a virtual MAC and virtual PHY between an application layer and an actual MAC and PHY layer, wireless transceiver resources may be allocated more efficiently to handle various data bandwidth requirements from different applications. Additionally, by selectively employing a variable duplex link, data transfers may be further optimized through finer control of link transmit and receive times.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A wireless networking system comprising:
   an application interface associated with one or more applications, the one or more applications having a wireless bandwidth requirement;
   a first wireless transceiver associated with an actual MAC interface and physical (PHY) interface, the first wireless transceiver having a first bandwidth availability up to a first actual bandwidth;
   a second wireless transceiver associated with the actual MAC interface and the PHY interface, the second wireless transceiver having a second bandwidth availability up to a second actual bandwidth;
   buffer circuitry coupled to the PHY interface, the buffer circuitry to buffer transmit and receive data between the wireless networking system and a duplex link;

programmable storage to store one or more values specifying a parameter associated with the buffer circuitry; and processing circuitry to evaluate the wireless bandwidth requirement and the first and second bandwidth availabilities of the wireless transceiver resources, the processing circuitry including a bandwidth allocator to allocate at least a portion of each of the first and second actual bandwidths to multiple virtual MAC interfaces and corresponding multiple virtual PHY interfaces to satisfy the application interface wireless bandwidth requirement and provide for simultaneous operation of the multiple virtual MAC and virtual PHY interfaces.

2. The wireless networking system according to claim 1, wherein the processing circuitry includes logic to monitor the availability of the first and second wireless transceivers to satisfy the wireless bandwidth requirement.

3. The wireless networking system according to claim 2, further including one or more additional transceivers, and wherein the logic feeds back data to the bandwidth allocator, the data indicating availability of the first, second, and one or more of the additional transceivers.

4. The wireless networking system according to claim 2, wherein the bandwidth allocator adaptively configures the multiple virtual MAC and virtual PHY interfaces based on the data indicating availability of the first, second, and one or more additional transceivers.

5. The wireless networking system according to claim 4, wherein:
the bandwidth allocator configures the multiple virtual MAC and virtual PHY interfaces during an initialization process.

6. The wireless networking system according to claim 4, wherein:
the bandwidth allocator configures the multiple virtual MAC and virtual PHY interfaces at least periodically or randomly on-demand during normal operation.

7. The wireless networking system according to claim 1, wherein:
the programmable storage stores values specifying respective transmit and receive times for the first and second transceivers; and
wherein the first and second wireless transceivers are configured to couple to a wireless variable duplex link, wherein the wireless variable duplex link exhibits an asymmetric transmit/receive profile defined by the specified transmit and receive times.

8. The wireless networking system according to claim 1, wherein:
the programmable storage stores values specifying respective transmit and receive storage capacities of the buffer circuitry; and
wherein the first and second wireless transceivers are configured to couple to a wireless variable duplex link, wherein the variable duplex link exhibits a transmit/receive profile responsive to the buffer storage capacities.

9. A method of operating a wireless transceiver system, the wireless transceiver system including an application interface, actual MAC and PHY interfaces, and processing lay circuitry between the actual MAC and PHY interfaces, the method comprising:
evaluating, with processing logic, application bandwidth requirements of applications associated with the applications interface;

defining multiple virtual MAC interfaces and corresponding virtual PHY interfaces between the processing circuitry and the actual MAC and PHY interfaces;
allocating, with a bandwidth allocator, multiple wireless transceivers in the actual MAC and PHY interfaces to be simultaneously operated by the multiple virtual MAC interfaces and the corresponding virtual PHY interfaces to satisfy the application bandwidth requirements; and
wirelessly transferring a stream of processed data via a wireless link with the allocated wireless transceivers.

10. The method of claim 9, wherein the evaluating comprises:
monitoring availability of the multiple wireless transceivers to satisfy the wireless bandwidth requirement.

11. The method of claim 10, wherein the monitoring includes:
feeding back data to the bandwidth allocator, the data indicating availability of the multiple transceivers.

12. The method of claim 11, wherein the allocating comprises:
adaptively configuring the multiple virtual MAC interfaces and corresponding virtual PHY interfaces based on the data indicating availability of the multiple transceivers.

13. The method of claim 12, wherein adaptively configuring the multiple virtual MAC interfaces and the corresponding virtual PHY interface takes place during an initialization process.

14. The method of claim 12, wherein adaptively configuring the multiple virtual MAC interfaces and the corresponding virtual PHY interfaces takes place at least periodically or randomly on-demand during normal operation.

15. The method of claim 10, wherein:
the multiple wireless transceivers are configured to couple to a wireless variable duplex link, wherein the wireless variable duplex link exhibits an asymmetric transmit/receive profile.

16. The method of claim 15, wherein:
the variable duplex link is programmable via one of a configurable buffer or RF cycle time.

17. A wireless transceiver for coupling to a wireless duplex link, the transceiver comprising:
programmable storage comprising a buffer circuit including a transmit buffer of a first storage capacity and a receive buffer of a second storage capacity wherein the first capacity is programmed to be different than the second capacity, the programmable storage including a register to store values corresponding to the first storage capacity and the second storage capacity;
a transmitter coupled to the programmable storage, the transmitter for transmitting data along a wireless link during a first portion of a programmed data transfer cycle;
a receiver coupled to the programmable storage, the receiver for receiving data from the wireless link during a second portion of the programmed data transfer cycle; and
wherein the wireless link exhibits an asymmetric transmit/receive profile based on information stored in the programmable storage.

18. The wireless transceiver of claim 17, wherein:
the programmable storage stores value representing respective transmit and receive times during an RF cycle; and
wherein a transmit time is programmed to be a different duration than the receive time.

19. The wireless transceiver of claim 17, wherein:
the programmable storage is programmed at least periodically or randomly on-demand during normal operation.

\* \* \* \* \*

UNITED STATES PATENT AND TRADEMARK OFFICE
CERTIFICATE OF CORRECTION

PATENT NO. : 9,788,305 B2
APPLICATION NO. : 14/526792
DATED : October 10, 2017
INVENTOR(S) : Sai C. Manapragada It is certified that error appears in the above-identified patent and that said Letters Patent is hereby corrected as shown below:

In the Claims

In Claim 9, Column 7, Line 63, replace "lay circuitry between the actual MAC and PHY interfaces," with --circuitry between the actual MAC and PHY interfaces,--

Signed and Sealed this
Nineteenth Day of September, 2023

Katherine Kelly Vidal
*Director of the United States Patent and Trademark Office*